United States Patent
Izumi (10) Patent No.: US 7,173,726 B2
(45) Date of Patent: Feb. 6, 2007

(54) COMMUNICATION APPARATUS, CONTROL METHOD OF THE COMMUNICATION APPARATUS, FACSIMILE APPARATUS, COMMUNICATION METHOD, AND PROGRAM

(75) Inventor: Michihiro Izumi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 887 days.

(21) Appl. No.: 10/268,664

(22) Filed: Oct. 11, 2002

(65) Prior Publication Data

US 2003/0076533 A1  Apr. 24, 2003

(30) Foreign Application Priority Data

Oct. 22, 2001  (JP)  ............................. 2001-324156

(51) Int. Cl.
G06F 15/00 (2006.01)
G06F 13/00 (2006.01)
H04N 1/00 (2006.01)

(52) U.S. Cl. .................... 358/1.15; 358/1.16; 358/1.14; 358/407

(58) Field of Classification Search ............... 358/1.15, 358/1.16, 1.18, 402, 1.14, 407; 347/14; 709/235, 709/227
See application file for complete search history.

(56) References Cited

U.S. PATENT DOCUMENTS

| | | | |
|---|---|---|---|
| 5,854,692 A | 12/1998 | Nakatani | 358/468 |
| 6,104,396 A | 8/2000 | Hanaoka et al. | 345/348 |
| 6,195,170 B1 | 2/2001 | Mizutani et al. | 358/1.14 |
| 6,961,137 B1 * | 11/2005 | Tamura | 358/1.15 |
| 6,963,418 B1 * | 11/2005 | Tanimoto | 358/1.15 |
| 7,110,789 B1 * | 9/2006 | Curtiss et al. | 455/556.1 |
| 2002/0018237 A1 * | 2/2002 | Okada et al. | 358/1.15 |
| 2003/0020773 A1 * | 1/2003 | Schantz et al. | 347/14 |
| 2003/0076526 A1 * | 4/2003 | Gopalan | 358/1.15 |
| 2005/0275873 A1 * | 12/2005 | Sekiguchi | 358/1.15 |

FOREIGN PATENT DOCUMENTS

| | | |
|---|---|---|
| JP | 10-16354 | 1/1998 |
| JP | 10-260797 | 9/1998 |

OTHER PUBLICATIONS

Patent Abstracts of Japan, vol. 1999, No. 10, May 28, 1999 (JP 11-146107).
Patent Abstracts of Japan, vol. 1999, No. 14, Sep. 7, 1999 (JP 11-242683).

* cited by examiner

Primary Examiner—Kimberly Williams
Assistant Examiner—Scott Schlack
(74) Attorney, Agent, or Firm—Fitzpatrick, Cella, Harper & Scinto (57) ABSTRACT

Disclosed are a communication apparatus capable of efficiently using a communication line, a control method of the communication apparatus, a facsimile apparatus, a communication method, and a program. To accomplish this, if "print later" in a menu is selected with an image displayed during data communication while a line is connected (S432), printing data is generated from an HTML file of the displayed image (S433). That is, the displayed image is designated as an image to be printed after the line is disconnected. The generated printing data is stored in a printing data buffer (S434). If the presence of the data in the printing buffer is detected (S437) after the line is disconnected (S436), the data is printed (S438).

16 Claims, 10 Drawing Sheets

```
<HTML><HEAD><TITLE>A</TITLE></HEAD><BODY>
<DIV align="center">KASHIWA TOURIST INFORMATION</DIV>
<HR>
<DIV align="center">GENRES</DIV>
<A href
="http://www.xxx.co.jp/guide1.htm"
accesskey="1">〹TOURIST INFORMATION</A><BR>

<A href
="http://www.xxx.co.jp/guide2.htm"
accesskey="2">〻SIGHTSEEING MAP</A><BR>
<HR>
</BODY>
</HTML>
```

COMMUNICATION APPARATUS, CONTROL METHOD OF THE COMMUNICATION APPARATUS, FACSIMILE APPARATUS, COMMUNICATION METHOD, AND PROGRAM

FIELD OF THE INVENTION

The present invention relates to a communication apparatus capable of receiving data and controlling printing on the basis of the received data, a control method of the communication apparatus, a facsimile apparatus, a communication method, and a program.

BACKGROUND OF THE INVENTION

Conventionally, a communication apparatus capable of receiving data and controlling printing on the basis of the received data is generally known.

On the other hand, data communication which is conventionally usually performed from computers can now be performed from telephones and facsimile apparatuses. In particular, a facsimile apparatus having an Internet connecting function can connect to a Web server by dial-up connection, receive data described in HTML and the like and image information such as JPEG and GIF, display the received data and information on a screen, and print out the displayed data and information.

More specifically, when a user presses a print key while received data is displayed, the display data stored in a VRAM is converted into a printing form. If the received data is color (RGB) image data, printing data is generated by converting this received data into a printing format by performing color conversion into four colors (CMYK) used in a printer. The converted printing data is input to and printed by a built-in printer.

Apparatuses for printing data received from the Internet are also disclosed in Japanese Patent Laid-Open Nos. 10-016354 and 10-260797. In these inventions, a printer directly receives data from the Internet and prints the received data. This saves the operator the trouble of printing received data after the data is displayed on a terminal such as a PC.

Unfortunately, the above prior art does not perform control, when a communication apparatus prints data, such that the printing process commences after the connection to the line is disconnected. Therefore, the connection to the line is maintained while printing is performed, so the communication line is unnecessarily used.

Especially when a communication apparatus contains an inkjet printer, an initial operation for preventing ink clogging and the like requires a long time, so the communication line is unnecessarily used. Likewise, if printing sheets of paper are used up, the communication line is unnecessarily used until new paper sheets are set. Furthermore, in the measured rate system, a useless line rental fee is charged.

SUMMARY OF THE INVENTION

The present invention has been made to solve the problems of the above prior art, and has as its object to provide a communication apparatus capable of efficiently using a line, a control method of the communication apparatus, a facsimile apparatus, a communication method, and a program.

According to the present invention, the forgoing object is attained by providing a communication apparatus comprising: receiving means for receiving data via a predetermined line; display means for displaying an image corresponding to the received data; designating means for designating the image displayed on the display means as an object to be printed after the line is disconnected; and control means for performing control such that the image designated by the designating means is printed after the line is disconnected.

According to another aspect of the present invention, the foregoing object is attained by providing a communication apparatus comprising: receiving means for receiving data described in markup language via a predetermined line; generating means for generating printing data by converting the received data; a memory for storing the generated printing data; and control means for performing control such that the printing data stored in the memory is automatically read out and printed, when detecting that the line is disconnected.

According to still another aspect of the present invention, the foregoing object is attained by providing a communication apparatus comprising: receiving means for receiving data via a predetermined line; display means for displaying an image corresponding to the received data; instructing means for giving an instruction such that the image displayed on the display means is printed; printing means for printing the image by using a printhead on the basis of the received data, when given a printing instruction from the instructing means; determining means for determining whether cleaning of the printhead is necessary; and control means for controlling the printing means to print the image after the line is disconnected, if the determining means determines that cleaning of the printhead is necessary.

According to still another aspect of the present invention, the foregoing object is attained by providing a communication apparatus comprising: receiving means for receiving data via a predetermined line; display means for displaying an image corresponding to the received data; instructing means for giving an instruction such that the image displayed on the display means is printed; printing means for printing the image by using a printhead on the basis of the received data, when given a printing instruction from the instructing means; determining means for determining whether cleaning of the printhead is necessary; and selecting means for selecting, if the determining means determines that cleaning of the printhead is necessary, whether to print the image while the line is kept connected or after the connection to the line is terminated; and control means for controlling the printing means to print the image while the line is connected or after the line is disconnected, in accordance with the selection by the selecting means.

According to still another aspect of the present invention, the foregoing object is attained by providing a communication apparatus comprising: receiving means for receiving data via a predetermined line; display means for displaying an image corresponding to the received data; instructing means for giving an instruction such that the image displayed on the display means is printed; printing means for printing the image on a printing medium on the basis of the received data, when given a printing instruction from the instructing means; determining means for determining the presence/absence of the printing medium; and control means for controlling the printing means to print the image after the line is disconnected, if the determining means determines that the printing medium is absent.

According to still another aspect of the present invention, the foregoing object is attained by providing a communication apparatus comprising: receiving means for receiving data via a predetermined line; display means for displaying an image corresponding to the received data; instructing means for giving an instruction such that the image displayed on the display means is printed; printing means for printing the image on a printing medium on the basis of the received data, when given a printing instruction from the instructing means; determining means for determining the presence/absence of the printing medium; selecting means for selecting, if the determining means determines that the printing medium is absent, whether to print the image while the line is kept connected or after the connection to the line is terminated; and control means for controlling the printing means to print the image while the line is connected or after the line is disconnected, in accordance with the selection by the selecting means.

According to still another aspect of the present invention, the foregoing object is attained by providing a facsimile apparatus comprising: receiving means for receiving data described in markup language via a predetermined line; generating means for generating printing data by converting the received data; a memory for storing the generated printing data; printing means for printing an image on the basis of the printing data stored in the memory; and control means for controlling the printing means to read out the printing data stored in the memory and print the readout data, after detecting that the line is disconnected.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

A preferred embodiment of the present invention will now be described in detail in accordance with the accompanying drawings. Note that the relative arrangement of constituent elements, the display screen, and the like described in this embodiment do not limit the scope of the present invention unless otherwise specified.

First Embodiment

As an embodiment of a communication apparatus according to the present invention, a facsimile apparatus capable of providing an "L mode" (registered trademark) service for a subscriber telephone will be explained below.

Figure 1:
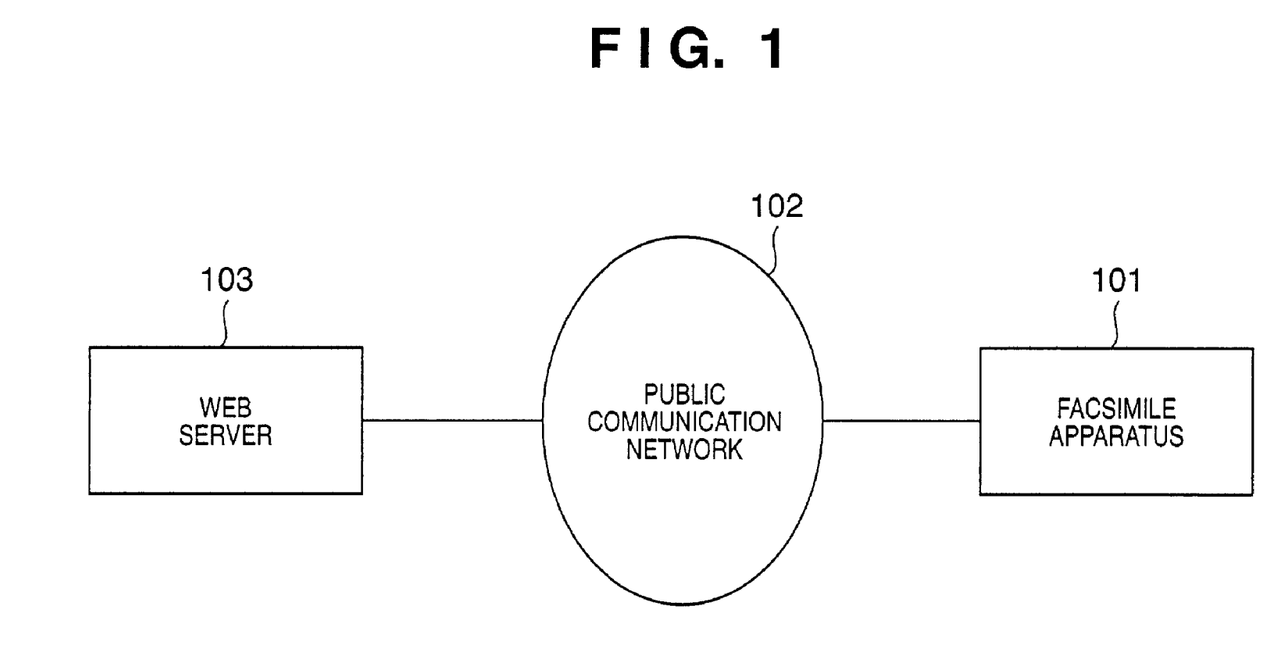
FIG. 1 is a view showing the connection of a communication apparatus as an embodiment of the present invention.

FIG. 1 is a view showing a system including a facsimile apparatus as this embodiment. In FIG. 1, reference numeral 101 denotes the facsimile apparatus; 102, a public communication network; and 103, a Web server. As shown in FIG. 1, the facsimile apparatus 101 of this embodiment can communicate data with the Web server 103 across the public communication network (Internet) 102.

Figure 2A:
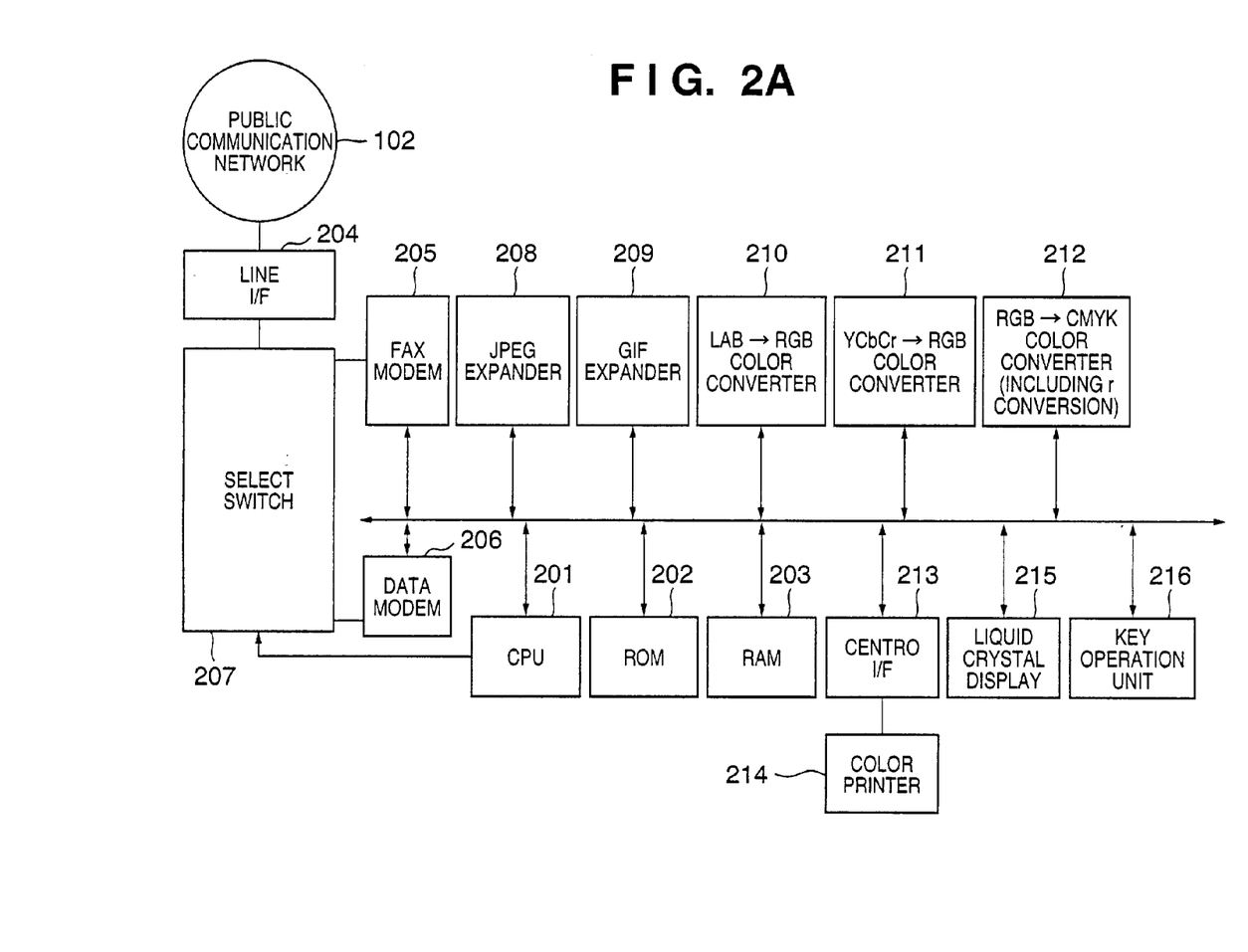
FIG. 2A is a block diagram showing the internal arrangement of the communication apparatus as the embodiment of the present invention.

FIG. 2A is a block diagram showing the internal arrangement of this facsimile apparatus. Referring to FIG. 2A, a CPU 201 controls the image communication apparatus 101 in accordance with a program stored in a ROM 202. A RAM 203 stores image data to be transmitted and received image data.

A line interface unit 204 controls outgoing and incoming calls with respect to the public communication line under the control of the CPU 201. A FAX modem 205 transmits and receives facsimile image data. When a facsimile image is received, this received facsimile image is demodulated by the FAX modem 205 and transferred to the RAM 203 through a data bus. A data modem 206 transmits and receives Web data. When Web data is received, the received modem signal is demodulated by the data modem 206 and transferred to the RAM 203 through the data bus.

An analog signal select switch 207 selectively connects the FAX modem and data modem to the public communication line. A JPEG expander 208 expands JPEG compressed image data when the data is received.

A GIF expander 209 expands GIF compressed image data when the data is received. An LAB→RGB color space converter 210 converts image data having the LAB color space into the RGB color space. A YCbCr→RGB color space converter 211 converts image data having the YCbCr color space into the RGB color space.

An RGB→CMYK color space converter 212 performs conversion when generating printing image data from RGB image data. In this conversion, γ conversion is performed to optimize printed colors.

A centronics interface 213 is a parallel communication interface for transferring image data to be printed to a built-in color printer. Reference numeral 214 denotes the color printer; 215, a liquid crystal display; and 216, a key operation unit.

Figure 2B:
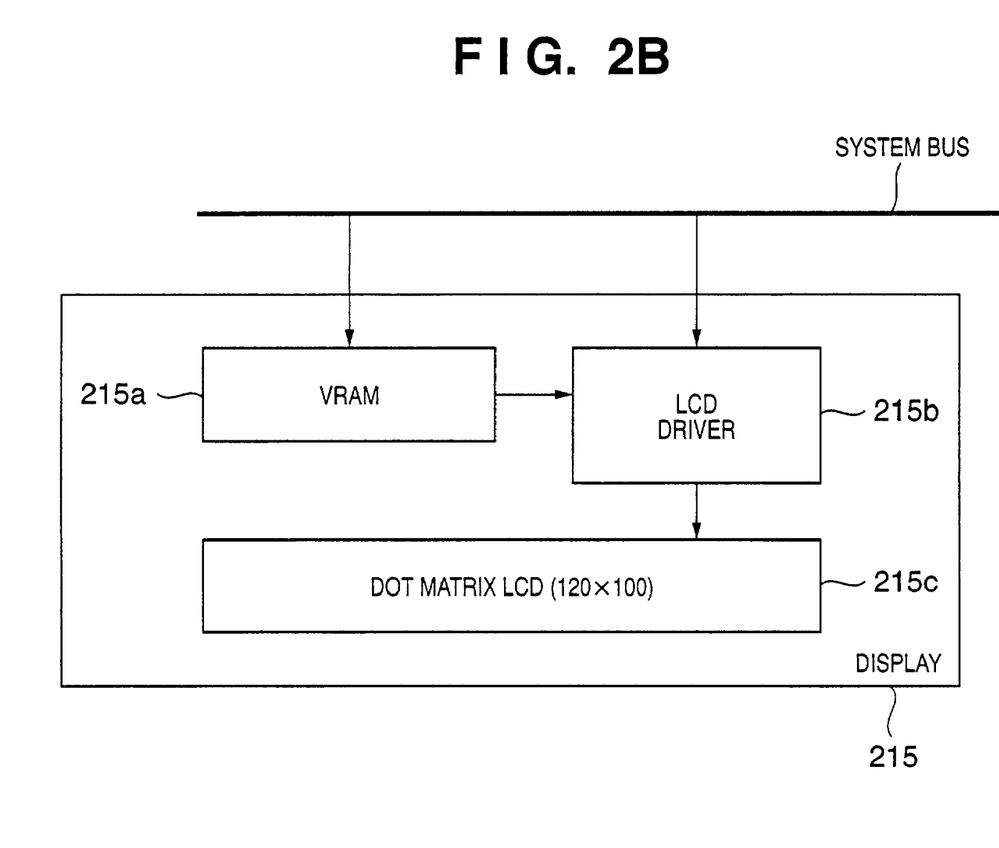
FIG. 2B is a block diagram showing the arrangement of a display unit of the communication apparatus as the embodiment of the present invention.

FIG. 2B shows the arrangement of the liquid crystal display 215. This liquid crystal display 215 includes a VRAM 215a for storing display data, an LCD driver 215b for outputting the contents of the VRAM 215a to a dot matrix LCD 215c, and this dot matrix LCD 215c.

Figure 2C:
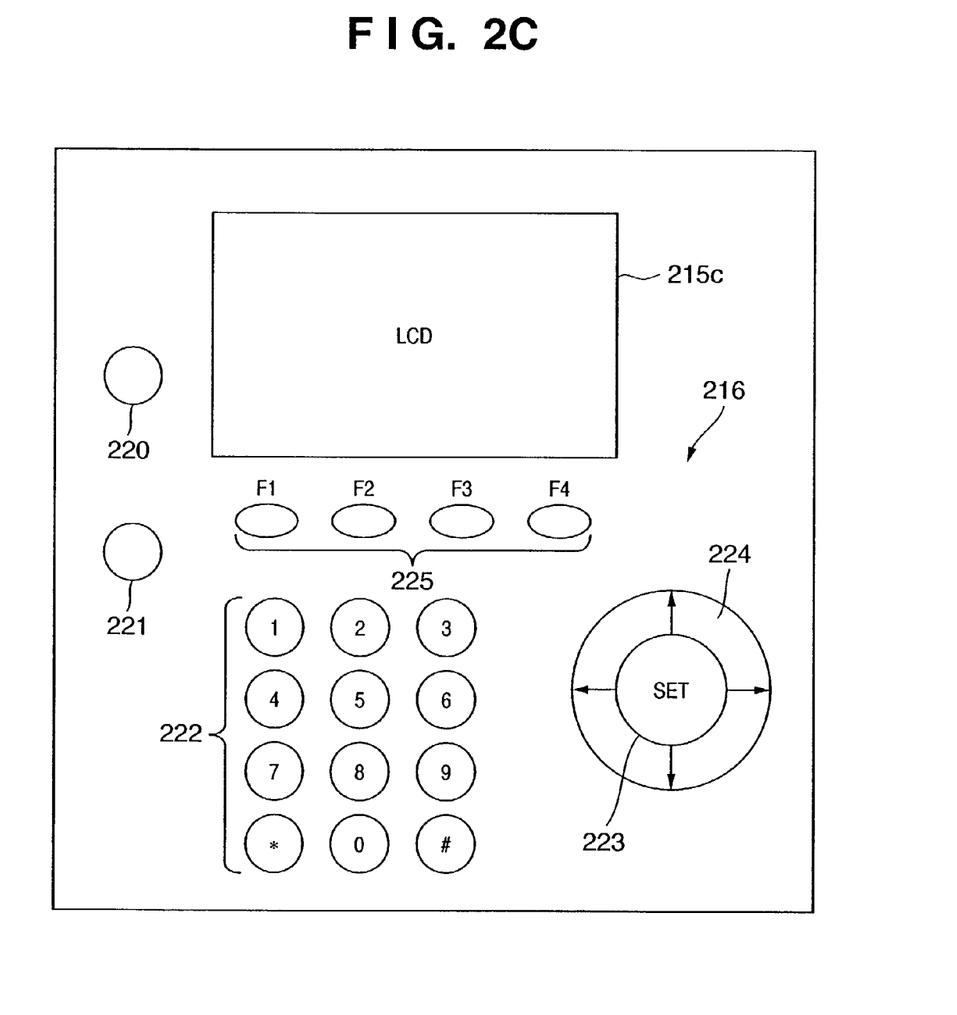
FIG. 2C is a view showing the arrangement of an operation unit of the communication apparatus as the embodiment of the present invention.

FIG. 2C shows details of the arrangement of the operation unit 216. In FIG. 2C, reference numeral 220 denotes an L mode key; 221, a menu key; 222, a ten-key pad; 223, a set key; 224, a cursor moving key; and 225, function keys.

Figure 3A:
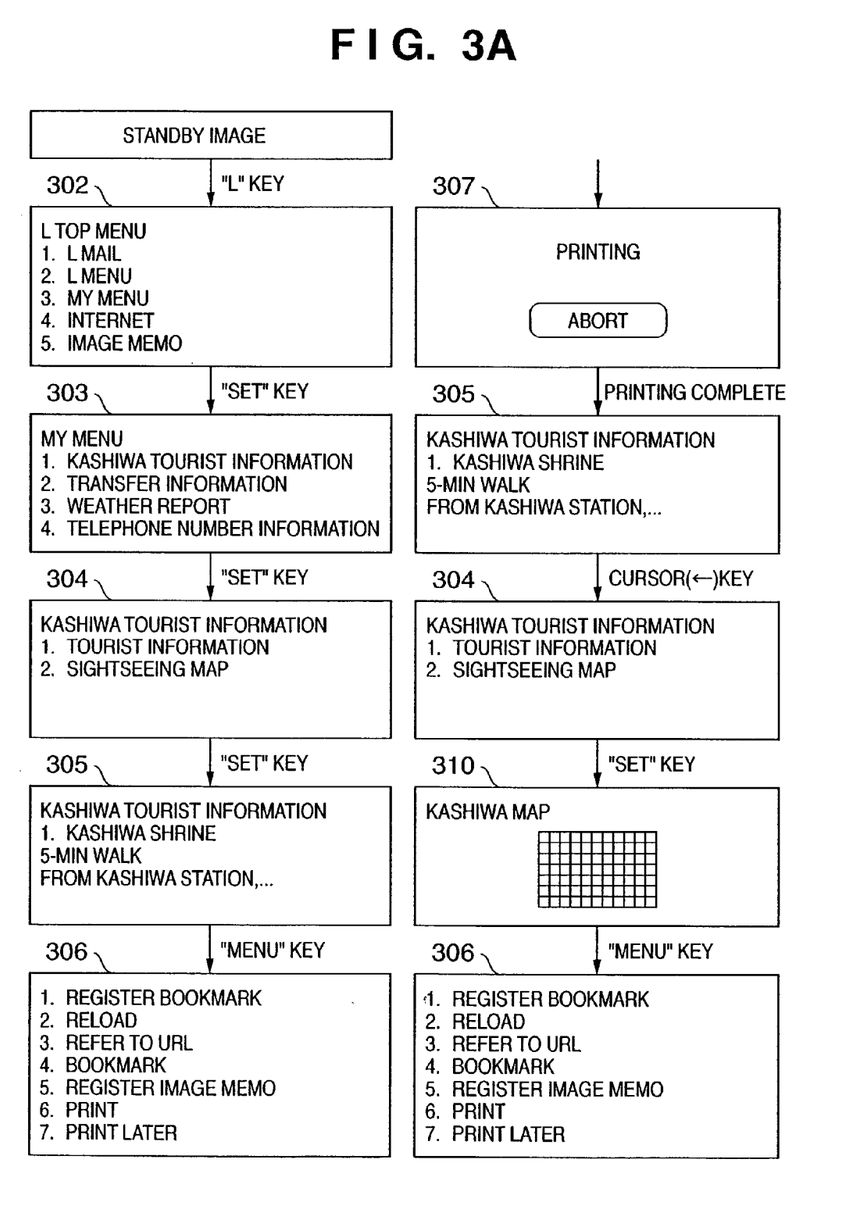
FIG. 3A is a view showing the display screen when an image data receiving process is performed by the communication apparatus as the embodiment of the present invention.
Figure 3B:
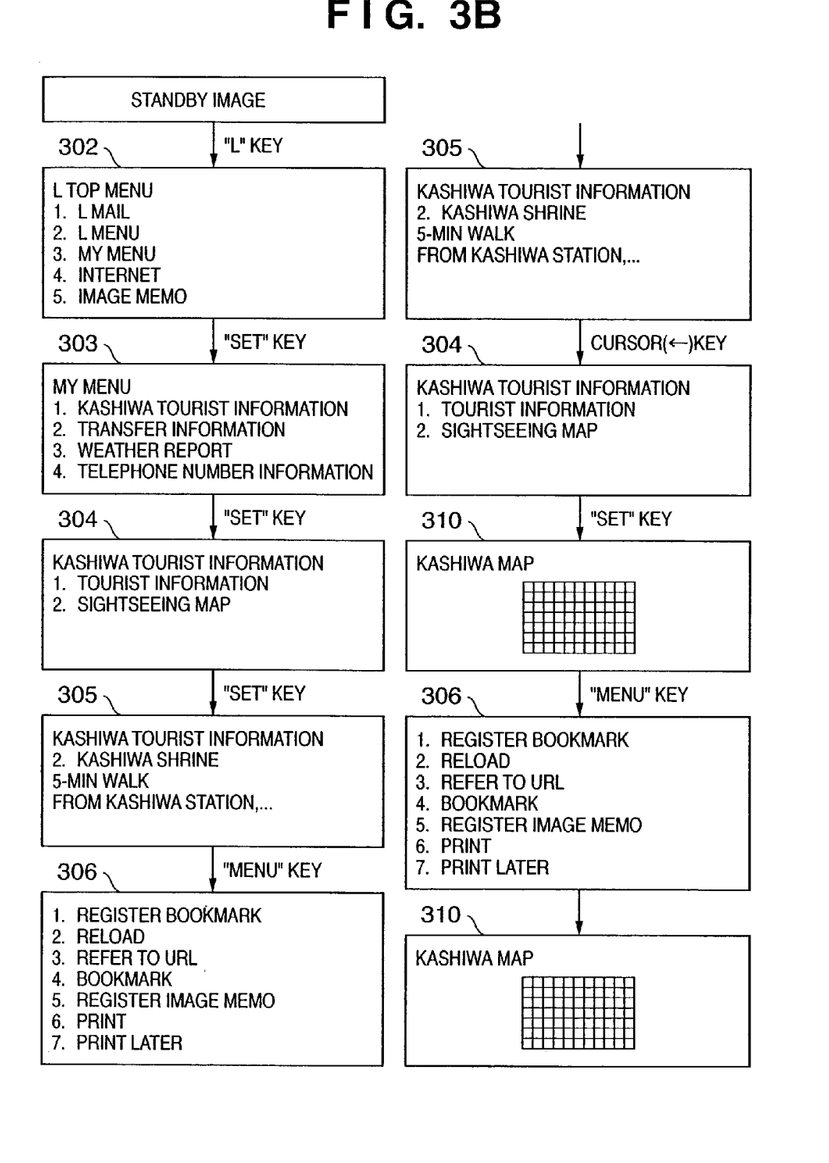
FIG. 3B is a view showing the display screen when the image data receiving process is performed by the communication apparatus as the embodiment of the present invention.

FIGS. 3A and 3B are transition diagrams showing the display screen in an L mode operation. The L mode operation is the state in which the facsimile apparatus 101 is connected to an L mode server via the data modem 206. FIG. 3A shows printing during the L mode operation, and FIG. 3B shows printing after the L mode. Both of FIGS. 3A and 3B are transition diagrams of standard operations in which printhead cleaning and the like do not occur.

Figure 4:
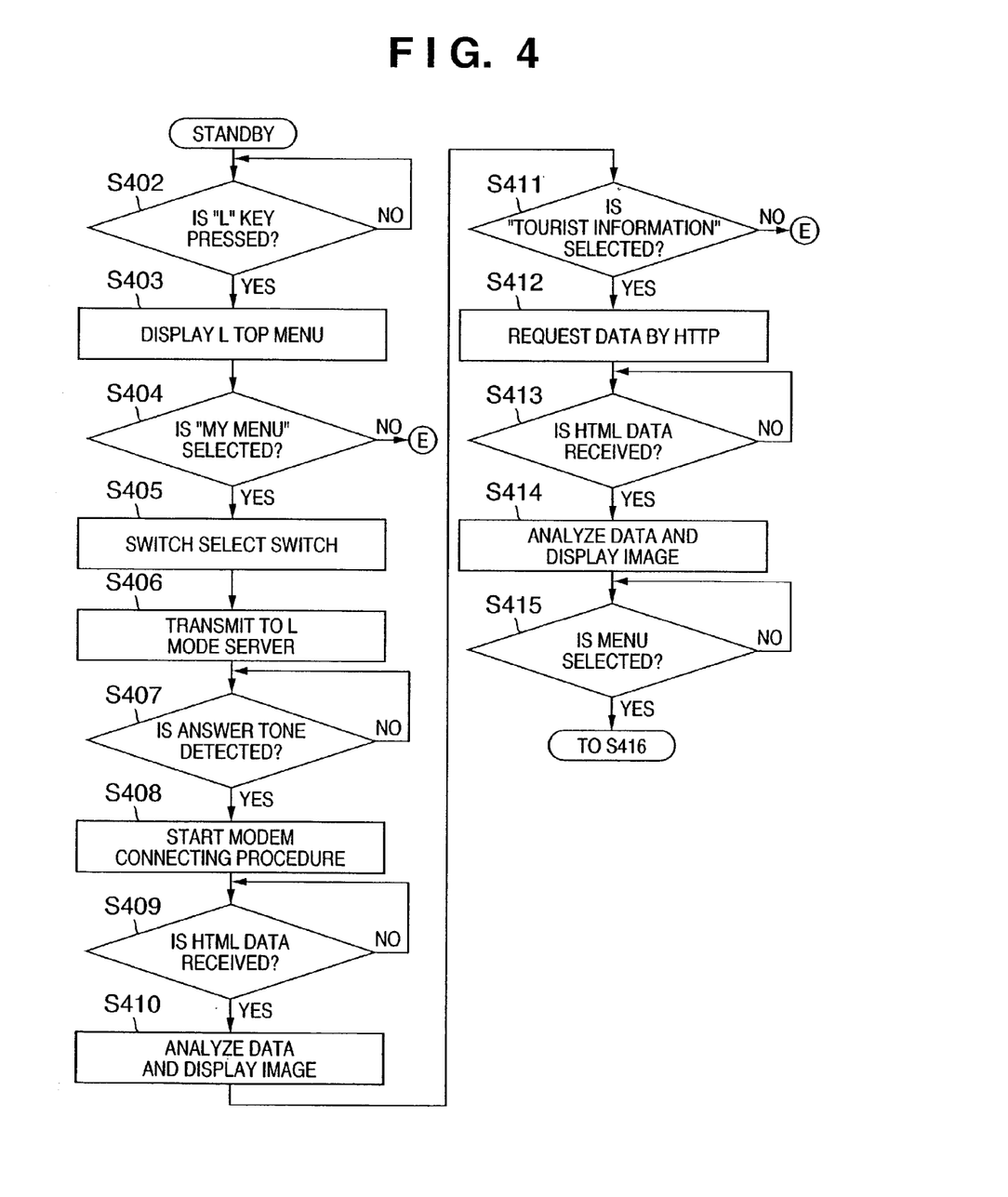
FIG. 4 is a flow chart when the image data receiving process is performed by the communication apparatus as the embodiment of the present invention.

FIG. 4 is an operation flow chart when an image displayed in the L mode is printed.

An operation in which the image communication apparatus having the L mode function receives and prints Web data will be explained below.

When the user presses the L mode key 220 of the key operation unit 216, the flow advances from step S402 to step S403, and an L top menu 302 as shown in FIGS. 3A and 3B is displayed. When the user selects "my menu" by using the cursor key 224 and presses the set key 223, the flow advances from step S404 to step S405, and connection to the L mode server is started.

"My menu" is the list of URLs which the user registered in the L mode server in advance. Note that the connection to the L mode server is also performed when the user selects "Internet", as well as "my menu", in the L top menu 302. In this case, the user directly enters a URL to access the Internet.

To connect to the L mode server, the CPU 201 controls the select switch 207 to connect the line and the data modem (S405). Subsequently, the CPU 201 controls the line interface unit 204 to call the telephone number of the L mode server (S406). When the line is connected and a modem answer tone transmitted from the L mode server is detected by the data modem 206 (S407), this data modem 206 starts a data modem connecting procedure (S408).

When completing this data modem connecting procedure, the data modem 206 receives "my menu" image data described in HTML from the L mode server (S409). The CPU 201 analyzes the received HTML data and displays a "my menu" image 303 (S410).

If the user selects, e.g., "Kashiwa tourist information", the flow advances from step S411 to step S412, and the CPU 201 requests, by HTTP, the L mode server to send data, and receives HTML data (step S413). The CPU 201 analyzes the received HTML data, converts the data into display data, and displays an image 304 indicating the contents of "Kashiwa tourist information" on the LCD 215c (S414).

Figure 7:
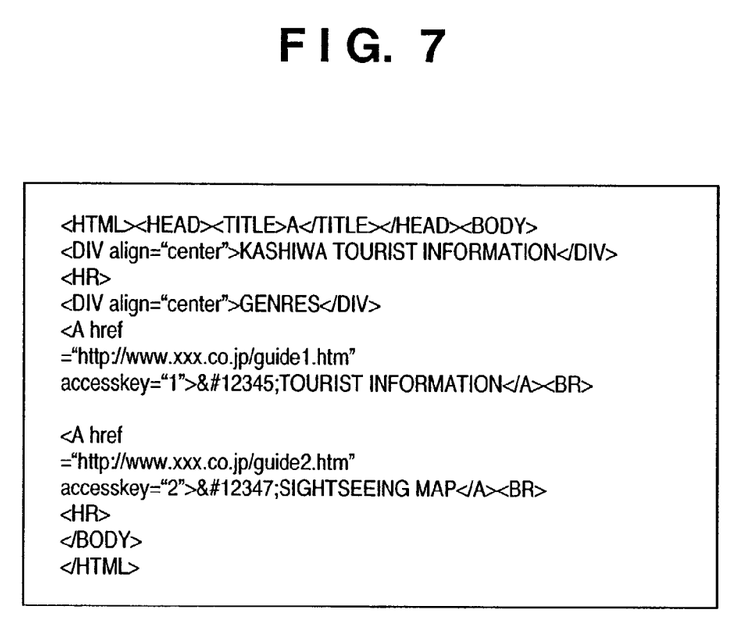
FIG. 7 is a view showing an example of HTML data which can be downloaded by the communication apparatus as the embodiment of the present invention.

In this embodiment, assume that HTML data as shown in FIG. 7 is received.

When this HTML data as shown in FIG. 7 is received, as shown in the image 304 of FIG. 3A, "1. Tourist Information" and "2. Sightseeing Map" are displayed on the LCD 215c. If the user uses the cursor key 224 to select "1. Tourist Information" and presses the "set" key 223, the flow advances from step S415 to step S416 in FIG. 5, and the CPU 201 accesses http://www.xxx.co.jp/guide1.htm by HTTP. The CPU 201 downloads tourist information text data contained in the page (S417).

Figure 5:
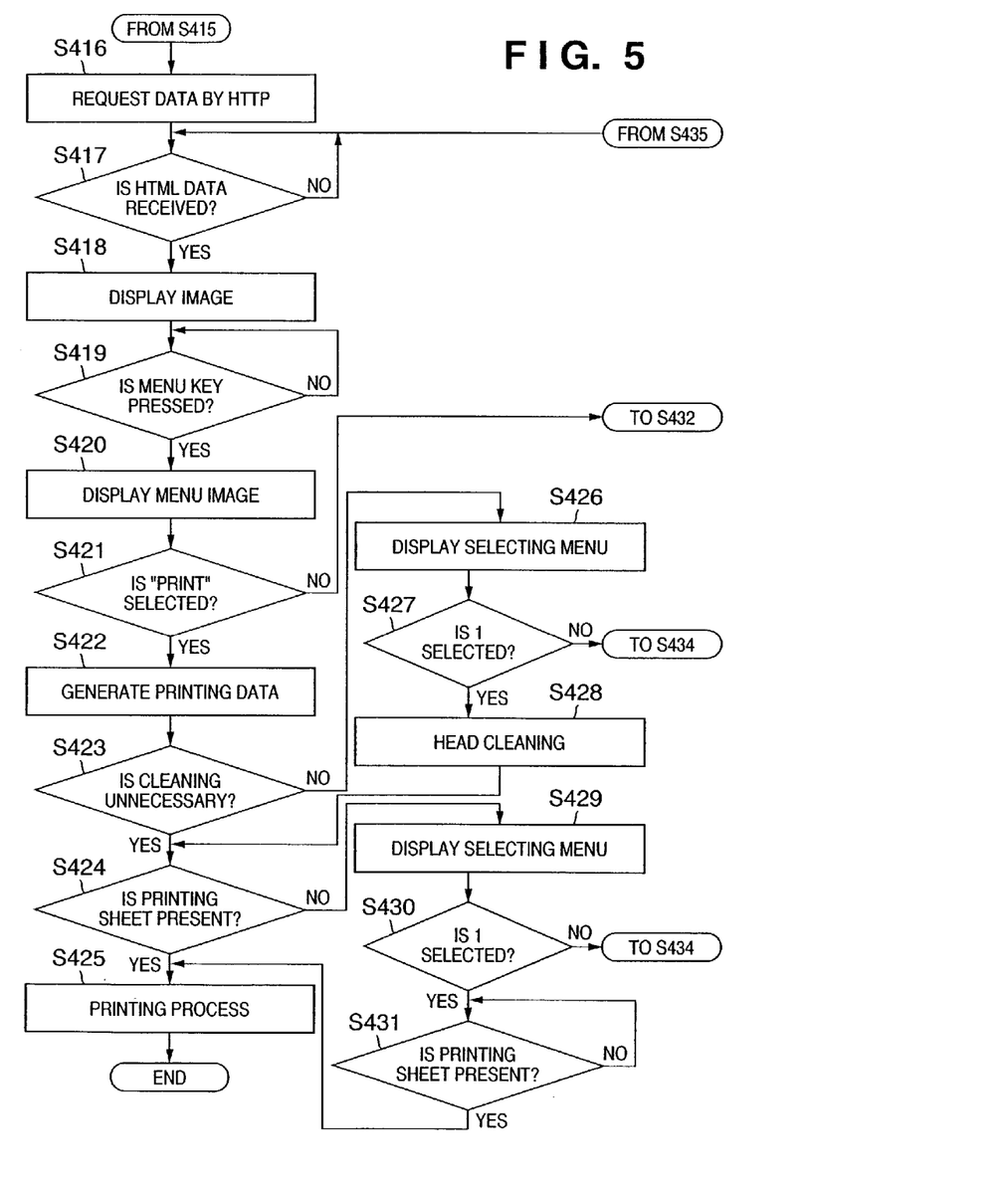
FIG. 5 is a flow chart when the image data receiving process is performed by the communication apparatus as the embodiment of the present invention.

After downloading the HTML file, the CPU 201 analyses the HTML to form display data, and transfers the data to the VRAM 215a in the liquid crystal display 215c. On the basis of this image data transferred to the VRAM 215a, the LCD driver 215b displays an image 305 on the LCD 215c (S418).

If the user presses the "menu" key 221 (S419), a process selecting menu 306 is displayed (S420). If the user selects "print" in this menu (S421), printing data is generated from the HTML file of the displayed image (S422).

Before starting this printing, the CPU 201 checks whether cleaning of the printhead is necessary (S423). More specifically, the CPU 201 reads out information of the date/time of the last printing and, if a predetermined time or more has passed from the indicated date/time, determines that cleaning is necessary. Since this cleaning requires about 1 min, the CPU 201 displays "Cleaning is necessary. 1. Print immediately? 2. Print after completion of communication?" to allow the user to select (S426).

If 1 is selected (S427), the CPU 201 performs cleaning of the printhead (S428), and checks the presence/absence of a printing sheet (S424). If a sheet is present, the previously generated data is transferred to the printer via the centronics interface and printed (S425).

If no sheet is present, the CPU 201 displays "1. Print by setting sheet 2. Print later" (S429). If 1 is selected (S430), the CPU 201 waits until a sheet is set. If the CPU 201 detects that a sheet is set, the data is transferred to the printer via the centronics interface and printed (S425).

During the printing, an image 307 is displayed on the LCD 215c.

If the user selects "print after completion of communication" in step S427 or S430, the flow advances to step S434, and the generated data is stored in a printing data buffer. If the user selects "print later" in step S432, printing data is generated from the HTML file of the displayed image (S433). That is, the image displayed in step S419 is designated as an image to be printed after the line is disconnected. If this "print later" is selected, the CPU 201 checks neither the necessity of head cleaning nor the presence/absence of a printing sheet, unlike when printing is immediately performed. The generated data is stored in the printing data buffer (S434). If the L mode is not terminated, the flow returns from step S435 to step S417 and, as shown in FIG. 3B, the process selecting menu 306 is erased and the tourist information image 305 is displayed. If the user presses the "return" key (in this case, the cursor key), the image 304 is returned.

If the user selects "2. Sightseeing Map", the CPU accesses http://www.xxx.co.jp/guide2.htm and downloads image data. The flow advances from step S417 to step S418. If the downloaded image data is a GIF image, the GIF expander 209 expands this GIF image, and the expanded image data is transferred to the VRAM 215a in the liquid crystal display 215. On the basis of this image data transferred to the VRAM, the LCD driver 215b displays an image 310 on the LCD 215c.

If the user presses the "menu" key in this state, the process selecting menu 306 is displayed. If the user selects "print" from this menu (S421), the RGB→CMYK color converter converts the displayed GIF image data into four-color data of C (cyan), M (magenta), Y (yellow), and K (black) required for printing. Since head cleaning is performed a moment ago, no more head cleaning is necessary. If the presence of a printing sheet is detected, the converted data is transferred to the printer via the centronics interface and printed (S425).

If the user selects "print later" in the menu image 306, the flow advances from step S421 to step S433 via step S432, and the RGB CMYK color converter converts the converted RGB image into four-color data of CMYK required for printing. The converted data is stored in the printing data buffer (S434). If the "return" key is pressed in this state, the image 304 is returned.

After that, printing data of the displayed image is sequentially stored in the printing data buffer by selecting "print later" following the same procedure as above, until the connection to the L mode server is terminated. That is, within the range of the internal memory capacity of the apparatus, printing data can be stored and the stored printing data can be printed at any arbitrary timings.

Figure 6:
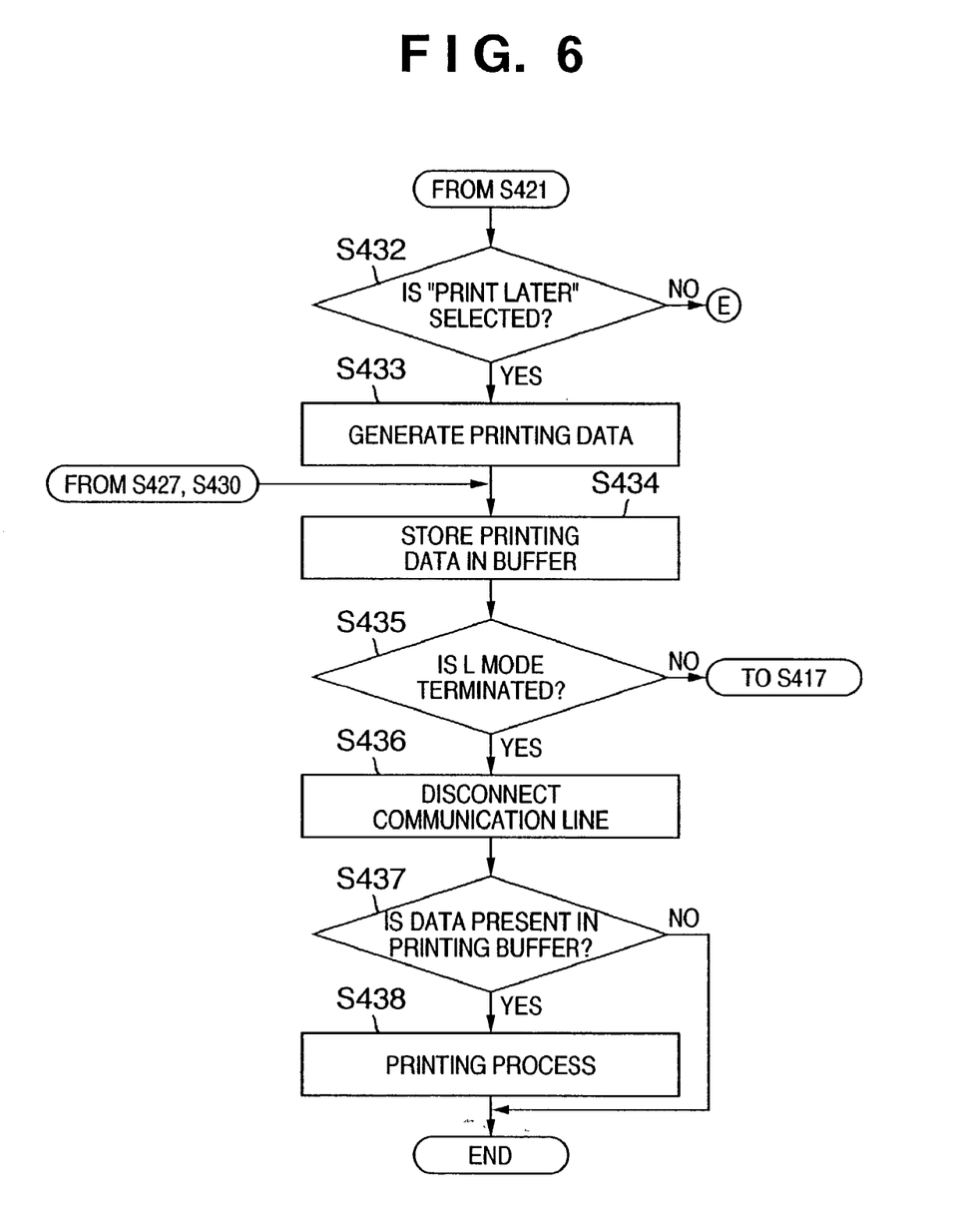
FIG. 6 is a flow chart when the image data receiving process is performed by the communication apparatus as the embodiment of the present invention.

When the connection to the L mode server is terminated, the flow advances from step S435 to step S436, and the CPU 201 disconnects the communication line and checks whether data is stored in the printing buffer (S437). If data is stored, the flow advances to step S438, and the CPU 201 sequentially reads out the printing data stored in the printing buffer and transfers the readout data to the printer via the centronics interface, thereby printing the data.

Other Embodiments

In the above embodiment, if the user selects "print later", printing data is stored in the buffer and automatically printed when the line is disconnected. However, printing data stored in the printing buffer can also be printed by a key operation by the operator.

In the above embodiment, data is stored in the printing buffer when "print later" is selected. However, a choice having a different name "image memo" can also be used.

When this "image memo" is selected, the displayed image is stored in a buffer. The data stored in this image memo buffer can be displayed at any arbitrary timing. While the data is displayed, it is possible to generate printing data and print the generated data by pressing the "menu" key and selecting "print" from the menu. That is, the displayed image can be designated simply as an object to be stored in the buffer, not as an object to be printed after the line is disconnected, and this image stored in the buffer can be printed at any arbitrary timing.

In the above embodiment, the user selects "print" to print data while the L mode is used, and selects "print later" to print data after the L mode is terminated. However, a similar effect can also be obtained by using only "print" as a choice. More specifically, when "print" is selected a message "Print immediately? Yes/No" is displayed. If "Yes" is selected, the data is immediately printed. If "No" is selected, the printing process is started after the L mode is terminated and the communication line is disconnected.

In the above embodiment, printing data is formed and saved in the memory so as to be printed after the communication line is disconnected. However, a similar effect can also be obtained by saving text data of an HTML file in the memory, and analyzing this HTML file to form printing data when it is necessary to print the text after the communication line is disconnected. Saving HTML file text data has the advantage that the memory capacity for data saving can be reduced. In addition, since printing data need not be formed during download from the Web server, the CPU resource can be preferentially assigned to the download. This can effectively increase the download rate.

In the above embodiment, a facsimile apparatus corresponding to the L mode is explained for the sake of convenience. However, the present invention is not limited to this embodiment and is applicable to all communication apparatuses capable of receiving data through lines. That is, the present invention can be applied to a system constituted by a plurality of devices (e.g., a host computer, interface, reader, and printer) or to an apparatus (e.g., a personal computer or copying machine) comprising a single device.

In the above embodiment, data described in HTML is received. However, the present invention is not limited to this embodiment. For example, HTML can be replaced with another markup language.

Further, the object of the present invention can also be achieved by supplying a storage medium (or recording medium) recording program codes of software for implementing the functions of the above embodiments to a system or apparatus, and reading out and executing the program codes stored in the storage medium by a computer (or a CPU or MPU) of the system or apparatus. In this case, the program codes read out from the storage medium implement the functions of the present invention, and these program codes constitute the invention. Furthermore, besides the functions of the above embodiments are implemented by executing the readout program codes by the computer, the present invention includes a case where an operating system (OS) or the like running on the computer performs part or the whole of actual processing in accordance with designations by the program codes and thereby implements the functions of the above embodiments.

Furthermore, the present invention also includes a case where the program codes read out from the storage medium are written in a memory of a function extension card inserted into the computer or of a function extension unit connected to the computer, and, in accordance with designations by the program codes, a CPU or the like of the function extension card or function extension unit performs part or the whole of actual processing and thereby implements the functions of the above embodiments.

When the present invention is applied to a program, this program comprises program codes corresponding to the flow charts (shown in FIG. 4 and/or FIG. 5 and/or FIG. 6) explained previously.

The present invention can provide a communication apparatus capable of efficiently using a communication line, a control method of the communication apparatus, a facsimile apparatus, a communication method, and a program.

As described above, an optimum printing process meeting the purpose can be performed by immediately printing data during the L mode communication or by printing data at a later time. That is, the above embodiment can achieve the following effects by selecting timings at which images downloaded from the Web server are printed.

If the user wants to print data although he or she also wants to keep download from the Web server, the data can be printed after the download is completed.

An image saved during browsing can be printed at a given later time.

Since a plurality of images can be printed at once, the printer need not be initialized. This shortens the printing time and saves ink.

As many apparently widely different embodiments of the present invention can be made without departing from the spirit and scope thereof, it is to be understood that the invention is not limited to the specific embodiments thereof except as defined in the claims.

What is claimed is:

1. A communication apparatus comprising: receiving means for receiving data via a telephone line;
  display means for displaying an image corresponding to the received data;
  first input means for inputting an instruction to print the image displayed by the display means;
  inquiring means for inquiring of user whether to print the image while the line is kept connected or to print the image after the connection to the line is terminated, before executing printing;

second input means for inputting a first instruction to print the image while the line is kept connected or a second instruction to print the image after the connection to the line is terminated; and control means for performing control such that when inputting the first instruction, the image is printed before disconnecting the telephone line and when inputting the second instruction, the image is printed after the telephone line is disconnected.

2. The apparatus according to claim 1, further comprising:
storage means for storing data corresponding to the image designated by said designating means; and
converting means for converting the data into printing data after the line is disconnected.

3. The apparatus according to claim 1, wherein the data is described in markup language.

4. The apparatus according to claim 1, further comprising:
converting means for converting the data of the image designated by said designating means into printing data; and
storage means for storing the printing data generated by said converting means.

5. The apparatus according to claim 1, further comprising instructing means for giving an instruction such that the image displayed on said display means is printed while the line is connected,
wherein said control means performs control, in accordance with the instruction by said instructing means, such that the image displayed on said display means is printed while the line is connected.

6. The apparatus according to claim 1, wherein said designating means can designate a plurality of images, and
said control means performs control such that the plurality of images are printed at once after the line is disconnected.

7. The apparatus according to claim 1, further comprising printing means for printing an image under the control of said control means.

8. A communication apparatus comprising:
receiving means for receiving data via a telephone line;
display means for displaying an image corresponding to the received data;
first input means for inputting an instruction to print the image displayed by the display means;
determining means for determining whether cleaning of a printhead is necessary, in response to the instruction inputted by the input means, before executing printing;
inquiring means for inquiring of a user whether to print the image while the telephone line is kept connected or to print the image after the connection to the telephone line is terminated, when said determining means determines that the cleaning of the printhead is necessary;
second input means for inputting a first instruction to print the image while the telephone line is kept connected or a second instruction to print the image after the connection to the telephone line is terminated; and
control means for controlling printing means to print the image while the telephone line is connected when the first instruction is inputted, or controlling said printing means to print the image after the telephone line is disconnected when the second instruction is inputted.

9. A communication apparatus comprising:
receiving means for receiving data via a telephone line;
display means for displaying an image corresponding to the received data;
first input means for inputting an instruction to print the image displayed by the display means;
determining means for determining the presence/absence of the printing medium, in response to the instruction inputted by the input means, before executing printing;
inquiring means for inquiring of a user whether to print the image while the line is kept connected or to print the image after the connection to the line is terminated, when said determining means determines that the print medium is absent;
second input means for inputting a first instruction to print the image while the line is kept connected or a second instruction to print the image after the connection to the line is terminated; and
control means for controlling printing means to print the image while the telephone line is connected when the first instruction is inputted, or controlling the printing means to print the image after the line is disconnected when the second instruction is inputted.

10. The apparatus according to claim 1, wherein said communication apparatus is a facsimile apparatus.

11. A communication method comprising:
a reception step of receiving data via a telephone line;
a display step of displaying an image corresponding to the received data;
a first input step of inputting an instruction to print the image displayed in said display step;
an inquiring step of inquiring of user whether to print the image while the line is kept connected or to print the image after the connection to the line is terminated, before executing printing;
a second input step of inputting a first instruction to print the image while the line is kept connected or a second instruction to print the image after the connection to the line is terminated;
a control step of performing control such that when inputting the first instruction, the image is printed before disconnecting the telephone line and when inputting the second instruction, the image is printed after the telephone line is disconnected.

12. A method of controlling a communication apparatus for printing an image by using a printhead, comprising:
a reception step of receiving data via a telephone line;
a display step of displaying an image corresponding to the received data;
a first input step of inputting an instruction to print the image displayed in said display step;
a determination step of determining whether cleaning of a printhead is necessary, in response to the instruction inputted in said input step, before executing printing;
an inquiring step of inquiring of a user whether to print the image while the telephone line is kept connected or to print the image after the connection to the telephone line is terminated, when said determining step determines that the cleaning of the printhead is necessary;
a second input step of inputting a first instruction to print the image while the telephone line is kept connected or a second instruction to print the image after the connection to the telephone line is terminated;
a cleaning step of cleaning the printhead after disconnecting the line, if the determination step determines that cleaning of the printhead is necessary; and
a printing step of printing the image after the cleaning step is completed.

13. A method of controlling a communication apparatus for printing an image on a printing medium, comprising:
a reception step of receiving data via a telephone line;
a display step of displaying an image corresponding to the received data;

a first input step of inputting an instruction to print the image displayed in said display step;

a determination step of determining the presence/absence of the printing medium, in response to the instruction inputted in said first input step, before executing printing;

an inquiring step of inquiring of a user whether to print the image while the line is kept connected or to print the image after the connection to the line is terminated, when said determining step determines that the print medium is absent;

a second input step of inputting a first instruction to print the image while the line is kept connected or a second instruction to print the image after the connection to the line is terminated;

a waiting step of waiting for replenishment of the printing medium after disconnecting the line, if the determination step determines that the printing medium is absent; and a printing step of printing the image when detecting replenishment of the printing medium.

14. A computer-readable medium comprising a program for allowing a computer to execute:

a reception step of receiving data via a telephone line;

a display step of displaying an image corresponding to the received data;

a first input step of inputting an instruction to print the image displayed in said display step;

an inquiring step of inquiring of user whether to print the image while the line is kept connected or to print the image after the connection to the line is terminated, before executing printing;

second input means for inputting a first instruction to print the image while the line is kept connected or a second instruction to print the image after the connection to the line is terminated; and a control step of performing control such that when inputting the first instruction, the image is printed before disconnecting the telephone line and when inputting the second instruction, the image is printed after the telephone line is disconnected.

15. A computer-readable medium comprising a program for controlling a communication apparatus for printing an image by using a printhead, wherein said program allows a processor installed in said communication apparatus to execute:

a reception step of receiving data via a telephone line;

a display step of displaying an image corresponding to the received data;

a first input step of inputting an instruction to print the image displayed in said display step;

a determination step of determining whether cleaning of a printhead is necessary, in response to the instruction inputted in said first input step, before executing printing;

an inquiring step of inquiring of a user whether to print the image while the telephone line is kept connected or to print the image after the connection to the telephone line is terminated, when said determining step determines that the cleaning of the printhead is necessary;

a second input step of inputting a first instruction to print the image while the telephone line is kept connected or a second instruction to print the image after the connection to the telephone line is terminated;

a cleaning step of cleaning the printhead after disconnecting the line, if the determination step determines that cleaning of the printhead is necessary; and a printing step of printing the image after the cleaning step is completed.

16. A computer-readable medium comprising a program for controlling a communication apparatus for printing an image by using a printhead, wherein said program allows a processor installed in said communication apparatus to execute:

a reception step of receiving data via a telephone line;

a display step of displaying an image corresponding to the received data;

a first input step of inputting an instruction to print the image displayed in said display step;

a determination step of determining the presence/absence of the printing medium, in response to the instruction inputted in said first input step, before executing printing;

an inquiring step of inquiring of a user whether to print the image while the line is kept connected or to print the image after the connection to the line is terminated, when said determining step determines that the print medium is absent;

a second input step of inputting a first instruction to print the image while the line is kept connected or a second instruction to print the image after the connection to the line is terminated;

a waiting step of waiting for replenishment of the printing medium after disconnecting the line, if the determination step determines that the printing medium is absent; and a printing step of printing the image when detecting replenishment of the printing medium.

* * * * *

UNITED STATES PATENT AND TRADEMARK OFFICE
CERTIFICATE OF CORRECTION

PATENT NO. : 7,173,726 B2 Page 1 of 1
APPLICATION NO. : 10/268664
DATED : February 6, 2007
INVENTOR(S) : Michihiro Izumi et al.

It is certified that error appears in the above-identified patent and that said Letters Patent is hereby corrected as shown below:

COLUMN 6

Line 37, "cursor key)," should read --cursor←key),--; and
Line 60, "RGB CMYK" should read --RGB→CMYK--.

COLUMN 8

Line 57, "receiving" should read --¶ receiving--.

COLUMN 9

Line 12, "designated by said designating means;" should be deleted;
Line 19, "designated by said designating means;" should be deleted; and
Line 32, "said designated means can designated a plurality of images, and" should be deleted.

COLUMN 11

Line 33, "second input means" should read --a second input step--.

Signed and Sealed this

Fifteenth Day of April, 2008

JON W. DUDAS
*Director of the United States Patent and Trademark Office*